United States Patent [19]

Moberg

[11] Patent Number: 5,077,602
[45] Date of Patent: Dec. 31, 1991

[54] COLOR DIFFERENCE COMPRESSOR
[75] Inventor: Gregory O. Moberg, Rochester, N.Y.
[73] Assignee: Eastman Kodak Company, Rochester, N.Y.
[21] Appl. No.: 481,001
[22] Filed: Feb. 15, 1990
[51] Int. Cl.⁵ .................... H04N 9/077; H04N 9/68
[52] U.S. Cl. ........................... 358/27; 358/29; 358/174
[58] Field of Search ............... 358/27, 21 R, 32, 29 C, 358/35, 170, 172, 174, 213.16, 29

[56] References Cited

U.S. PATENT DOCUMENTS

| | | | |
|---|---|---|---|
| 4,069,432 | 1/1978 | Bazin | 358/27 |
| 4,754,321 | 6/1988 | Srivastava | 358/27 |
| 4,754,323 | 6/1988 | Kaji | 358/29 C |
| 4,814,861 | 3/1989 | Hieda | 358/29 |
| 4,816,917 | 3/1989 | Yamamoto et al. | 358/213.16 |
| 4,821,100 | 4/1989 | Yamamoto | 358/170 |
| 4,862,251 | 8/1989 | Belmares-Sarabia | 358/27 |
| 4,962,417 | 10/1990 | Schultz | 358/27 |

FOREIGN PATENT DOCUMENTS 8505718 12/1985 World Int. Prop. O. ............ 358/27

Primary Examiner—Tommy P. Chin
Attorney, Agent, or Firm—David M. Woods

[57] ABSTRACT

A color difference compressor operating in a color difference baseband system compensates for illumination overload in the output of a color sensor by switching a pair of multiplexers between the active video portion of the color difference signals and a predetermined blanking level. The output signal from the sensor is separated into three colors by a sample/hold circuit prior to generations of the color difference signals and a signal overload in any one of the three colors triggers an overload control signal that switches the multiplexers.

6 Claims, 4 Drawing Sheets

COLOR DIFFERENCE COMPRESSOR

BACKGROUND OF THE INVENTION

1. Field of the Invention

This invention relates to the field of video signal processing and, more particularly, to the processing of color video signals to compensate for the effect of sensor overload.

2. Description Relative to the Prior Art

Image sensors, particularly charge-coupled device (CCD) sensors, are driven into a non-linear region of response when the photosites are brightly illuminated and, in the case of CCD sensors, the charge levels approach the maximum well capacity. This means that the output signal from the sensor does not respond proportionately to the input light. In such a condition, the sensor is said to be overloaded, at least for the sensor photosites that experience such a response. Color image sensors, of course, are sensitive to several constituent colors which are combined in subsequent video processing to form an output video signal representative of the color of the input light. Furthermore, a given color is ordinarily made up of unequal amounts of the constituent colors. Since, therefore, for high illumination the charge residing in the different color-sensitive photosites will be driven non-linear at different points, the resultant color represented by the output video signals shifts away from the desired color. Moreover, the color shift is unpredictable. This produces visually unappealing colors in local areas of the reproduced image.

It is known how to monitor the level of the color signals from the sensor and to reduce a composite output video signal in some controlled fashion when overload is detected. For example, Sony Corporation has disclosed an NTSC processor circuit that provides dynamic color compensation for an NTSC signal. The several color signals from the sensor are compared to a threshold. When the threshold is exceed by any one of the color signals, the modulated chrominance signal is accordingly reduced or set to some predetermined level. The result is to produce a white output for the affected image points. It has been found that an ordinary viewer tolerates a white error, rather than some arbitrary color, and image quality is thereby preserved. It is further possible to fade the whole NTSC signal under certain situations, such as when a recording operation stops.

Color compensation systems operating in modulated chrominance space cannot be conveniently adapted to other color systems. In particular, it would be desirable to provide overload compensation for systems producing baseband signals, such as systems producing red, green, blue (RGB) or luminance and color difference signals (Y, R-Y, B-Y).

SUMMARY OF THE INVENTION

Color compensation for sensor overload in a baseband video system is provided by detecting a signal overload in one or more of the separate color signals generated by a color sensor and accordingly adjusting the level of the baseband signals toward the blanking level when such an overload is detected. In one embodiment, a circuit responsive to detection of an overload generates a bi-level digital signal that is used to switch the baseband signal to the blanking level, thus producing a white output. In another embodiment, an analog control signal is used to drive the baseband signals toward the blanking level in proportion to the level of the analog control signal.

BRIEF DESCRIPTION OF THE DRAWINGS

The invention will be described in relation to the drawings, in which.

DETAILED DESCRIPTION OF THE INVENTION

Figure 1:
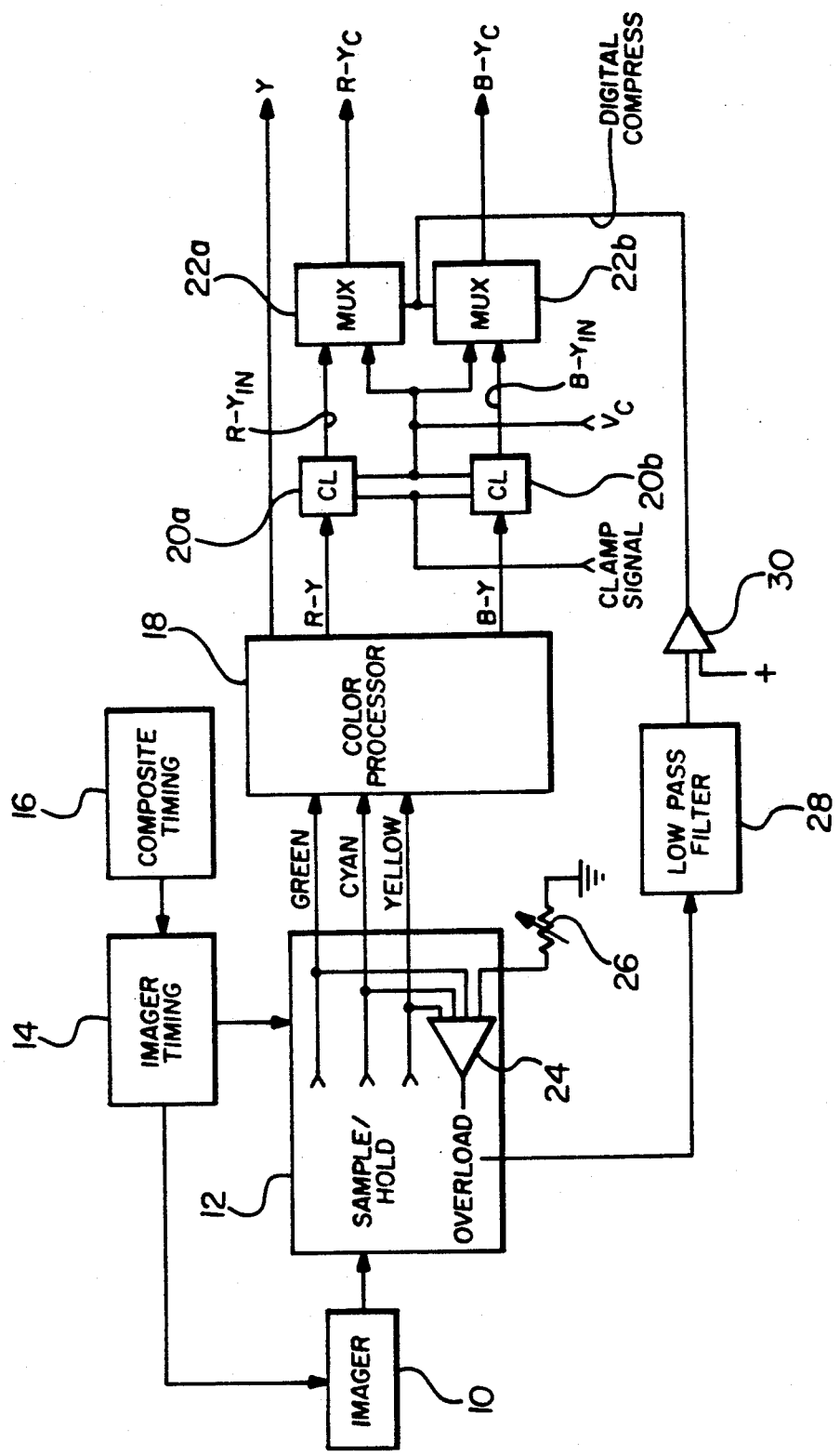
FIG. 1 is a block diagram of a color compressor circuit arranged according to the invention.

Referring first to FIG. 1, an imager 10 provides a stream of input signals to a sample/hold circuit 12, which separates the input color signals from the stream thereof and provides an output constituting separate color signals. In the preferred embodiment the imager 10 is a CCD imager chip manufactured by Sony Corp. (part No. ICX022AK), which provides a resolution of 768 horizontal photosites in 493 vertical lines, and the sample/hold circuit 12 is a processor chip manufactured by Sony Corp. (part No. CXA1337Q-Z/R). The particular sample/hold circuit employed in this embodiment provides an output constituting separate green, cyan, and yellow signals. Since the color sequence inherent in the output signal from the imager 10 depends upon the particular color filter array used with the sensor, the imager 10 and the sample/hold circuit 12 must be accordingly timed pixel-by-pixel by a timing circuit 14 to provide the requisite color separation. Other video timing matters, such as composite sync, composite blanking, burst flag, and the like, are provided by a composite timing circuit 16. In the preferred embodiment, the timing circuit 14 is a IC chip manufactured by Sony Corp. (part No. CXD1035BQ) which is adapted for the color filter array pattern provided on the particular imager chip 10 employed in this embodiment. Since the composite timing circuit 16 is not critically related to the architecture and pattern of either the imager 10 or the sample/hold circuit 12, it may be provided by a conventional design.

The separated green, cyan, and yellow signals are applied to a color processor 18, which utilizes color matrices or like algorithms to mathematically process the input signals and to produce a baseband luminance signal (Y) and two baseband color difference signals (R-Y, B-Y). In the preferred embodiment the color processor 18 is an IC chip manufactured by Sony Corp (part No. CXA1339Q-Z/R), which is especially adapted to process the green, cyan, and yellow signals provided by the sample/hold circuit 12. The output color difference signals (R-Y, B-Y) are applied to respective clamps 20a, 20b for line-by-line clamping of the color difference signals (R-Y, B-Y) to a dc black level provided by the clamp signal voltage. The clamped signals (R-Y$_{in}$, B-Y$_{in}$) and a dc compression voltage (V$_c$) are applied to respective analog multiplexers 22a, 22b, which select between the two pairs of input signals and provide a color compressed output constituted by the compressed color difference signals (R-Y$_c$, B-Y$_c$)

The analog multiplexers 22a, 22b are switched to pass the compression voltage (V$_c$) whenever an overload is detected by a thresholding circuit incorporated in the sample/hold circuit 12. For instance, the three sampled outputs of the circuit 12 are jointly connected to a comparator 24 for comparison with a threshold voltage provided by a potentiometer 26. If any of the color levels exceeds the threshold voltage, an overload control signal is provided to a low pass filter 28. The filter 28 time aligns the switching signal to the multiplexers 22a and 22b with the color difference signals R-Y, B-Y, eliminates high frequency white noise and noise spikes due to the sample/hold function, and spreads the effect of color compression over a number of image pixels, rather than the one or few pixels that have directly experienced overload. The latter function improves the visual aspect of overload by insuring that the compensation is spread over several pixels. The low pass filter is a conventional fast attack, slow decay type of filter design. The filtered output is applied to a comparator 30, which functions as a 1-bit analog-to-digital convertor and provides a digital overload signal (DIGITAL COMPRESS) to the switching inputs of the multiplexers 22a and 22b.

Figure 2A:
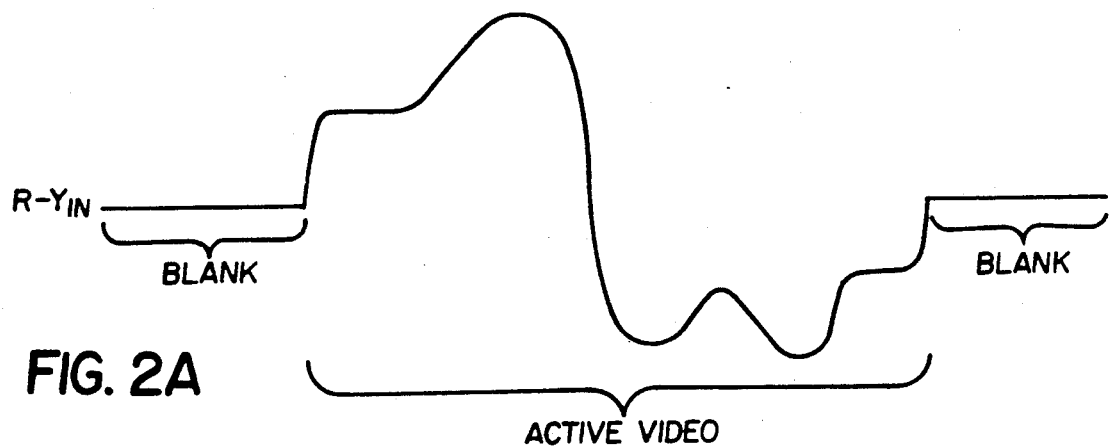
FIGS 2A, 2B and 2C are waveform diagrams of several signals appearing in the circuit of FIG. 1.
Figure 2B:
Figure 2C:
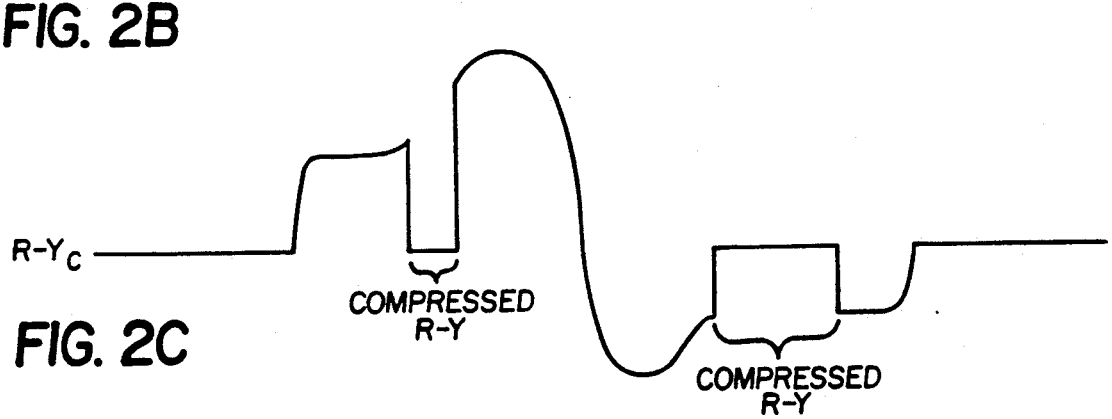

The operation of the circuit of FIG. 1 can be further understood by reference to the waveform diagrams of FIG. 2. The color difference signal R-Y$_{in}$ that is applied to the analog multiplexer 22a is shown in FIG. 2(A) to include a characteristic clamped blanking portion and an active video portion. The problem of overload-caused color shift arises during the active video portion when one or more of the constituent color signals (the green, cyan, and yellow signals, in this case) begin to respond non-linearly to impinging light. The threshold potentimeter 26 is set accordingly to detect this condition and the circuit 12 outputs an overload control signal at such time to the low pass filter 28. The output of the filter 28 is converted to the digital signal DIGITAL COMPRESS, which is shown by FIG. 2(B) to extend (because of the low pass filtering) over a range of image pixels. When the digital overload signal DIGITAL COMPRESS goes high, the analog multiplexers 22a and 22b switch over to the compression voltage V$_c$. In this embodiment, the compression voltage V$_c$ is substantially the same value as the clamp signal, that is, the same as the blanking level of the color difference signal (R-Y$_{in}$). The output signal (R-Y$_c$) shown in FIG. 2(C) is therefore compressed to the blanking level for regions corresponding to the overload signal (FIG. 2(B)). Such compressed regions correspond to white in the reproduced image. Although not shown in FIG. 2, the other color difference signal (B-Y$_{in}$) is similarly processed.

FIG. 2 is also useful in illustrating that it is not always obvious from the color difference signal where in the active video a constituent color has overloaded. The overload is masked in the color difference signal (but not in the reproduced image) in part because the signal is a difference and in part because some low amplitude output image colors may include one or more overloaded constituents. For example, although flesh color is frequently of relatively low amplitude, one of the constituent colors (green, cyan, or yellow, in this system) may go non-linear and shift the image color, often toward green. The color difference compressor detects such situations and instead shifts the color toward white. Overload compensation, therefore, is clearly a compromise but nonetheless based on the proven assumption that shifts toward white are visually more tolerable than uncontrolled, seemingly random, shifts toward other colors.

Figure 3:
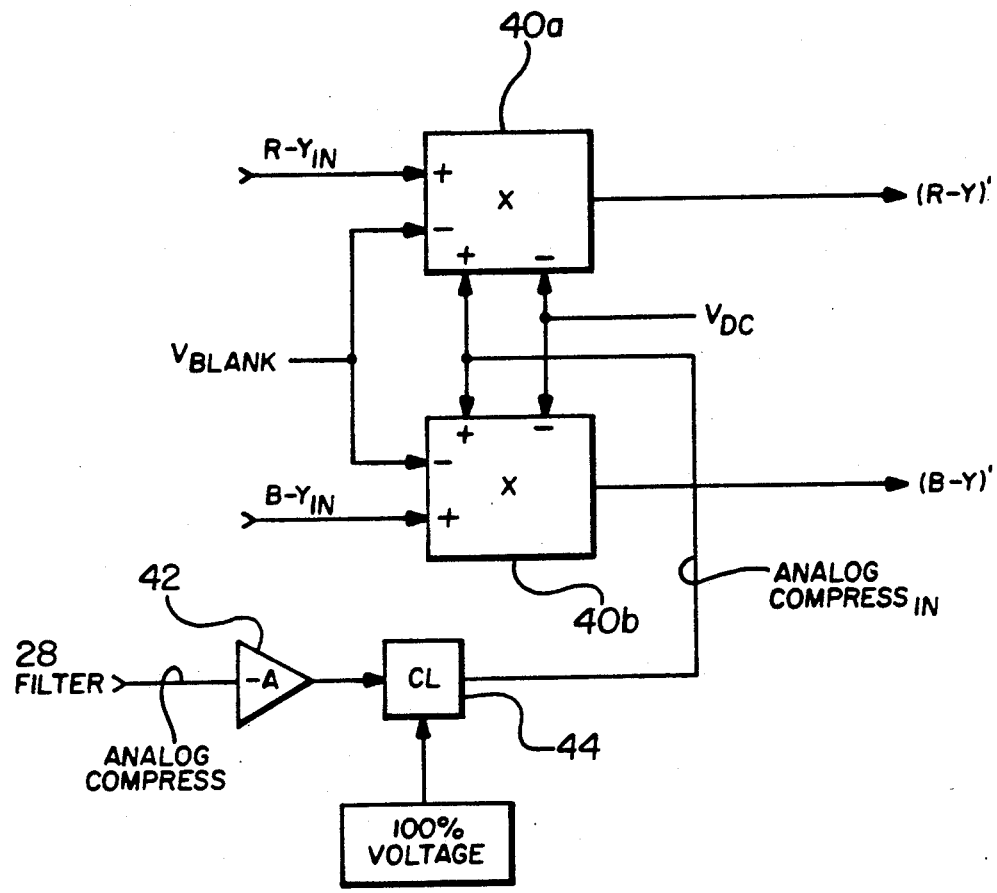
FIG. 3 is an alternative embodiment of the compression elements shown in FIG. 1.
Figure 4A:
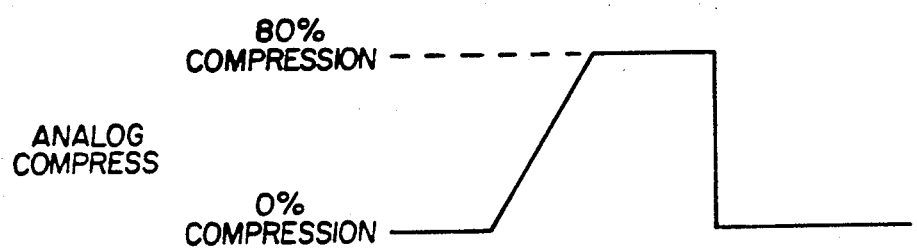
FIGS. 4A and 4B are waveform diagrams of signals processed by the alternative elements of FIG. 3.
Figure 4B:
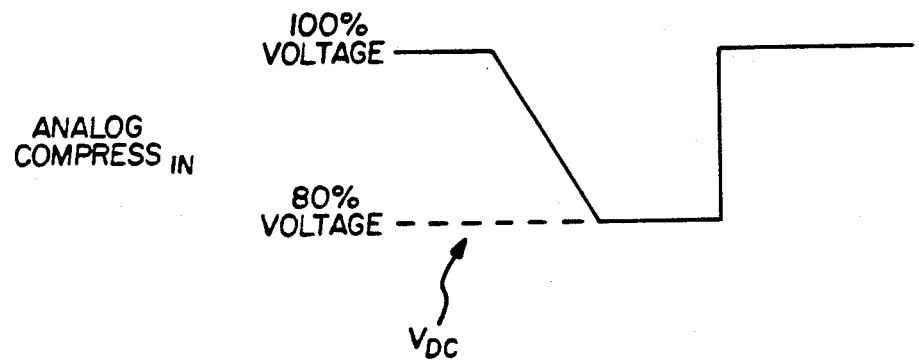

The circuit illustrated thus far is a digital compensator that essentially goes all the way to white for any overload. This was preferred because it can be implemented economically with very few parts. In many situations, analog compression will be preferable in which the black level can be gradually approached in proportion to the amount of overload. FIG. 3 illustrates circuit components that can be substituted for the analog multiplexers 22a, 22b and the comparator 30 to provide analog compression. The substitute components include multipliers 40a, 40b for operating upon the respective color difference signals (R-Y$_{in}$, B-Y$_{in}$). The analog overload signal output from the filter 28 is inverted in the negative gain amplifier 42 and clamped in clamp 44 to a maximum voltage level (100% voltage). The effect is seen for a gradually increasing overload signal in FIG. 4. The output signal (ANALOG COMPRESS) from the low pass filter 28 is shown in FIG. 4(A) to increase over time from 0% compression to 80% compression. The inverted output signal (ANALOG COMPRESS$_{in}$) after clamping is shown in FIG. 4(B) to decrease over time from 100% voltage to 80% voltage (relative to V$_{DC}$). The latter signal, when applied to the multipliers 40a and 40b brings the output signals (R-Y$_c$, B-Y$_c$) down in unison from their uncompressed values to within 20% of the blanking level. The percentages chosen, of course, are exemplary and the circuit can be driven to any level.

The foregoing disclosure is made in relation to certain commonly available integrated circuit components. Other components, or a custom design, can likewise be used in the practice of the invention. In that case, the color separation provided by the sample/hold function may deliver other colors, such as cyan, yellow, magenta. The color processor 18 would then be changed to accommodate such a different set of colors. Furthermore, the generation of the overload control signal can be separately accomplished (with, for example, the disclosed comparator and potentiometer arrangement) rather than incorporated into the sample/hold chip itself. Such modifications as these are within the ordinary skill in this art.

The invention has been described in detail with particular reference to a presently preferred embodiment, but it will be understood that variations and modifications can be effected within the spirit and scope of the invention.

What is claimed is:

1. In a video signal processing circuit for compensating for signals, generated by an image sensor, that have a non-linear response to high illumination thereby causing respective portions of the output signal to overload, the combination comprising:
   means for generating a plurality of color signals from the output signal of the image sensor;
   means for detecting a signal overload in one or more of said color signals;
   means responsive to said detecting means for generating an overload control signal;
   means for simultaneously generating two baseband video signals from the color signals, said baseband signals including a blanking level;
   means responsive to said overload control signal for identically adjusting the level of both baseband video signals toward the blanking level whenever a signal overload is detected in one or more of said color signals.

2. A video signal processing circuit as claimed in claim 1 in which said overload control signal generated by said means responsive to said detecting means is a bi-level digital overload control signal and said means responsive to said digital overload control signal drives the baseband video signals to the blanking level whenever the value of the digital overload control signal indicates said overload.

3. A video signal processing circuit as claimed in claim 1 in which said overload control signal generated by said means responsive to said detecting means is an analog overload control signal and said means responsive to said analog overload control signal drives the baseband video signals toward the blanking level in proportion to the level of the analog overload control signal.

4. In a video signal processing circuit for compensating for signals, generated by an image sensor, that have a non-linear response to high illumination thereby causing respective portions of the output signal to overload, the combination comprising:

means for generating a plurality of color signals from the output signal of the image sensor;
means for generating an overload signal whenever one or more of the color signals exceeds a predetermined threshold voltage;
means for generating baseband video signals from the color signals, said baseband signals including a blanking level;
means for providing a compression voltage having a level corresponding to the blanking level;
multiplexing means having output means for providing the output signal, first input means for receiving the baseband signals, and second input means for receiving the compression voltage;
means responsive to the overload signal for switching the compression voltage on said second input means to said output of said multiplier means whenever one or more of the color signals exceeds the predetermined threshold voltage, whereby the baseband signal level is compressed to the blanking level when a signal overload is detected.

5. A video signal processing circuit as claimed in claim 4 wherein the baseband signals include a first color difference signal and a second color difference signal, and said multiplexing means includes a first multiplexer having first and second input means for receiving the first color difference signal and the compression voltage respectively, and a second multiplexer having first and second input means for receiving the second color difference signal and the compression voltage, respectively.

6. A video signal processing circuit as claimed in claim 4 wherein the image sensor includes an array of picture elements, and said switching means responsive to the overload signal includes a low pass filter for receiving the overload signal and for providing a filtered output signal for switching said multiplexer means, said filtered output signal extending over a greater time period than said overload signal whereby the effect of the compensation is spread over several picture elements.

* * * * *